(No Model.)
W. P. BREEDING.
Galvanizing Metal.
No. 230,463. Patented July 27, 1880.
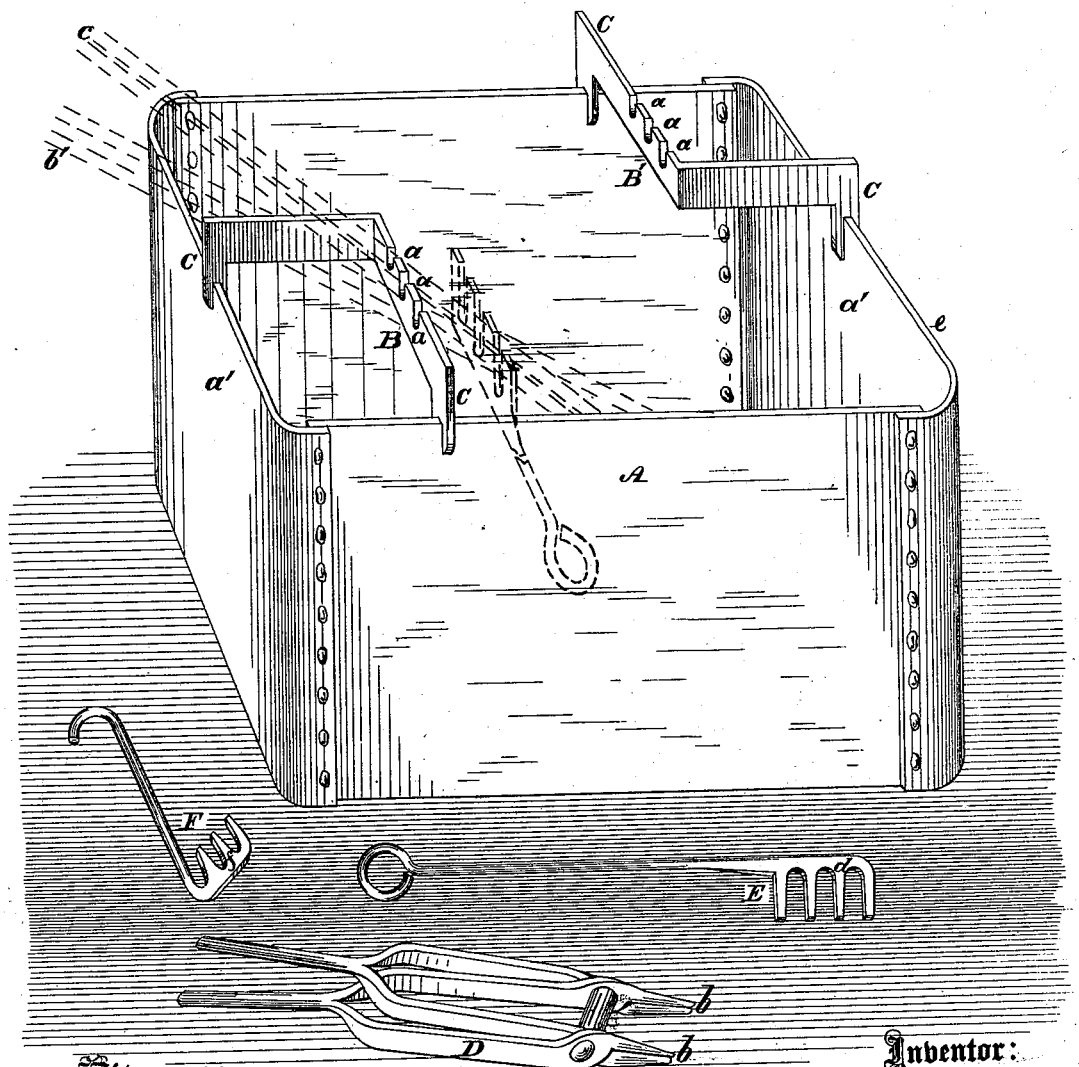
Witnesses:
A. P. Grant,
W. J. Kircher
Inventor:
Wm. P. Breeding,
by John A. Wiedersheim
ATTORNEY.

UNITED STATES PATENT OFFICE.

WILLIAM P. BREEDING, OF PHILADELPHIA, PENNSYLVANIA, ASSIGNOR OF ONE-HALF OF HIS RIGHT TO C. H. HORNE, OF SAME PLACE.

GALVANIZING METALS.

SPECIFICATION forming part of Letters Patent No. 230,463, dated July 27, 1880.

Application filed April 28, 1880. (No model.)

*To all whom it may concern:*

Be it known that I, WILLIAM P. BREEDING, a citizen of the United States, residing in the city and county of Philadelphia, and State of Pennsylvania, have invented a new and useful Improvement in Galvanizing Metals, which improvement is fully set forth in the following specification and accompanying drawing, which is a perspective view of the galvanizing apparatus and appurtenances embodying my invention, which consists of means for conveniently galvanizing long articles and removing the surplus galvanizing-coating therefrom.

Referring to the drawing, A represents a tank, on the diagonal upper corners of which are supported guides B B', consisting of upright plates C of L-shape, the transverse parts whereof have vertical slots *a a*, and project sufficiently from the ends *a'* of the tank in order to occupy positions above and over the tank.

D represents tongs with double jaws *b*. E represents guides, and F represents carriers, all of which are convenient appurtenances or tools of the apparatus, but not claimed in the present application.

The operation is as follows: Pipe or other articles are dipped into the tank A at one side of the end, as at *b'*, the tank containing the galvanizing-metal, and when thus dipped the required length of time the operator conveys some of the articles toward the adjacent guides B, as at *c*, by grasping with the tongs the outer ends of as many of the articles as there are jaws *b* of the tongs (which, though shown as two in number, may be of a greater number) and lifting the articles over the guides and resting them thereon. The articles are then drawn through the slots *a*, the effect whereof is to separate the articles to prevent their union and direct the drip into the tank.

If the articles are pipes, one jaw of each pair of jaws of the tongs enters a pipe, the jaws being presented to the ends and not to the sides of said articles. The guide E is now presented transversely over the tank near the guide B, with its tines or forks *d* pointing upward and under the articles, so as to support said articles as their ends emerge from the bath. The articles are now carried to the other side, *e*, of the tank, and the ends previously outside of the bath are dipped into the bath, so as to galvanize said ends. The articles are then moved over the guide B' and drawn therefrom by the tongs D, the operation and result being similar to that described of the guide B. The guide E and carrier F are then placed under opposite ends of the articles and the latter carried thereby to the water-trough, where they are cooled, after which they are conveyed to a place of storage or elsewhere.

By these means articles, especially long ones, may be galvanized in a convenient and uniform manner, and the work expeditiously and quickly accomplished, the surplus metal being saved and the articles prevented from adhering as they emerge from the bath.

Having thus described my invention, what I claim as new, and desire to secure by Letters Patent, is—

The tank A, provided with the guides B B', substantially as and for the purpose set forth.

WM. P. BREEDING.

Witnesses:
 JOHN A. WIEDERSHEIM,
 A. P. GRANT.